United States Patent [19]

Graffin

[11] Patent Number: 5,676,344
[45] Date of Patent: Oct. 14, 1997

[54] DEVICE FOR MAGNETICALLY CONTROLLING A SHUTTER MEMBER IN A TUBULAR BODY, AND A VARIABLE FLOW RATE FILLER SPOUT INCLUDING SUCH A DEVICE

[75] Inventor: André Graffin, La Chapelle du Bois, France

[73] Assignee: Serac Group, La Ferte Bernard, France

[21] Appl. No.: 671,377

[22] Filed: Jun. 27, 1996

[30] Foreign Application Priority Data

Jul. 5, 1995 [FR] France .................... 95 08107

[51] Int. Cl.⁶ .................... F16K 31/08
[52] U.S. Cl. .................... 251/65
[58] Field of Search .................... 251/65, 129.03

[56] References Cited

U.S. PATENT DOCUMENTS

| | | |
|---|---|---|
| 3,612,363 | 10/1971 | Carter . |
| 4,452,423 | 6/1984 | Beblavi et al. .................... 251/65 |
| 4,948,091 | 8/1990 | Satoh et al. .................... 251/65 |
| 5,039,061 | 8/1991 | Heard . |
| 5,069,239 | 12/1991 | Bunce et al. .................... 251/65 X |
| 5,129,619 | 7/1992 | Castetter . |
| 5,484,133 | 1/1996 | Oliver .................... 251/65 X |

FOREIGN PATENT DOCUMENTS

| | | |
|---|---|---|
| 0329287 | 8/1989 | European Pat. Off. . |
| 0436214 | 7/1991 | European Pat. Off. . |
| 2001143 | 1/1970 | Germany . |

*Primary Examiner*—Kevin Lee
*Attorney, Agent, or Firm*—Griffin, Butler, Whisenhunt & Kurtossy

[57] ABSTRACT

A drive member of magnetic material is coupled to a shutter member and co-operates with a magnetic field generator connected to a control member. The magnetic field generator is mounted inside a sleeve of non-magnetic material secured to the tubular body. The sleeve extends substantially along the axis of the tubular body having one end closed and having its opposite end opening out to the outside of the tubular body. The drive member extends outside the sleeve facing the magnetic field generator.

5 Claims, 1 Drawing Sheet

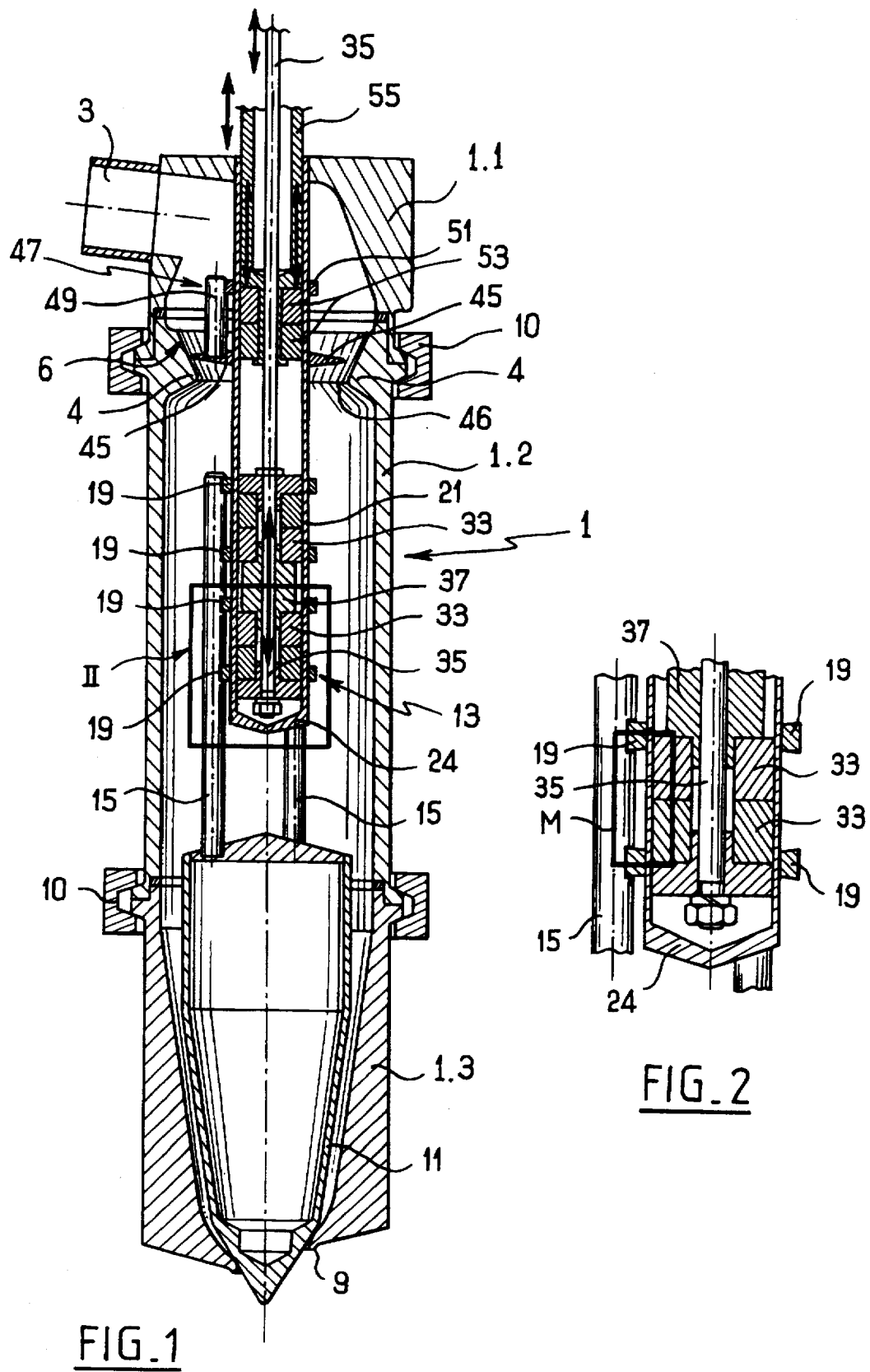

DEVICE FOR MAGNETICALLY CONTROLLING A SHUTTER MEMBER IN A TUBULAR BODY, AND A VARIABLE FLOW RATE FILLER SPOUT INCLUDING SUCH A DEVICE

The present invention relates to a device for magnetically controlling a shutter member movably mounted in a tubular valve body, whether said shutter member forms a valve member associated with an end flow orifice or a flow rate regulating member associated with a flow orifice defined by an intermediate constriction in the wall of a filler spout, and it also relates to a variable flow rate filler spout including a valve and a flow rate regulating member controlled by such a device.

BACKGROUND OF THE INVENTION

Numerous devices are known for actuating a shutter member in a valve or a filler spout of a packaging machine. Those devices generally include a control member passing through the wall of the filler spout so there is a need to provide sealing between the wall of the filler spout and the control member to prevent the substance that is to be packaged from escaping.

Such sealing gives rise to difficult problems, in particular when the substance to be packaged is abrasive or is chemically aggressive since the movements of the control member give rise to a risk of any gasket being damaged quickly. Major problems also arise with substances that need to be packaged in sterile manner because of the pollution that may be conveyed by the control member passing through the wall of the filler spout: it is then necessary to provide complex devices making use of sterile fluid or vapor barriers, or of membranes, which are fragile.

In order to limit passage through the wall of a filler spout via the control member, a magnetic control device is known from document U.S. Pat. No. 4,949,207 for controlling a shutter member that is mounted in a tubular valve body to slide facing a flow orifice of the body. That device includes a solid cylindrical magnetic core coupled to the valve member and disposed coaxially with the tubular valve body which is made of a non-magnetic material. The position of the core is controlled from outside the body by a magnetic field generator. Nevertheless, such a device suffers from the drawback that the substance to be dispensed flows between the magnetic core and the tubular body. This implies a flow constriction if it is desired to keep the distance between the magnetic core and the magnetic field generator small in order to obtain adequate force for lifting the valve member. In addition, wall cleaning is made difficult, particularly for fluids that carry solids or that are constituted by pulp. In addition, the flow of viscous substances is made difficult because of a wall effect.

In order to remedy that drawback, proposals have been made for a magnetically controlled device in which the magnetic core is implemented in the form of a ring connected to the shutter member by link arms that allow flow to take place through the ring. Satisfactory magnetic attraction force is thus ensured without impeding the flow. However, that device does not give entire satisfaction when it is desired to conserve a flow that is laminar inside the tubular body, since the flow is disturbed by the valve member driving ring, and above all by the link arms thereof.

OBJECTS AND SUMMARY OF THE INVENTION

The present invention provides a magnetic control device for controlling a shutter member movably mounted in a tubular body facing a flow orifice of the body, the device including a drive member of magnetic material coupled to the shutter member and co-operating with a magnetic field generator connected to a control member, wherein the magnetic field generator is mounted inside a sleeve of non-magnetic material secured to the tubular body, the sleeve extends substantially along the axis of the tubular body having one end closed and an opposite end opening out to the outside of the tubular body, and the drive member extends outside the sleeve facing the magnetic field generator.

Thus, valve member control takes place in the center of the tubular body so that the regularity of the flow against the inside face of said body is not disturbed by any obstacle across the flow. In addition, sealing is provided by stationary parts, the inside of the sleeve being totally isolated from the flow through the tubular body. Also, the required magnetic field strength is low since the wall of the sleeve can be very fine, so that the bulk of the magnetic field generator and of the associated drive member is small.

In a preferred embodiment, the drive member includes at least two rings slidably mounted on the sleeve and connected together by a link member extending in an axial direction, the magnetic field generator being organized to generate a field in an axial direction and possessing two axial ends disposed facing the rings of the drive member.

This establishes a magnetic loop, with the magnetic field coming from one of the axial ends of the magnetic field generator being channeled by the axial link member towards the opposite polarity end of the generator.

It is then advantageous for one of the rings of the drive member to form the shutter member.

The invention also provides an adjustable flow rate filler spout comprising a tubular body having a terminal flow orifice associated with a first shutter member forming a valve member, and in which an upstream flow orifice defined by an intermediate constriction in the tubular body is associated with a second shutter member forming a flow rate regulation member, the first and second shutter members being controlled by a magnetic control device including drive members of magnetic material co-operating with a magnetic field generator, the magnetic field generators are mounted inside a sleeve secured to the tubular body, the sleeve extends substantially along the axis of the tubular body with one end closed and with an opposite end opening out to the outside of the tubular body, and the drive members are slidably mounted on the sleeve facing the corresponding magnetic field generators.

It is then advantageous for the control member of one of the two magnetic field generators to be slidably mounted in the control member of the other magnetic field generator.

BRIEF DESCRIPTION OF THE DRAWINGS

Other characteristics and advantages of the invention appear on reading the following description of a particular non-limiting embodiment given with reference to the accompanying figures, in which:

FIG. 1 is an axial section view of a filler spout with controllable flow rate that includes a magnetic control device of the invention, the valve member being in its closed position and the flow rate regulation member being in its partially open position; and FIG. 2 is a view on an enlarged scale of box II of FIG. 1.

MORE DETAILED DESCRIPTION

With reference to the figures, the adjustable flow rate filler spout with magnetic control of the invention comprises a tubular valve body 1 having a top portion 1.1 connected to a transverse feed tube 3, an intermediate portion 1.2 including a constriction 4 having a conical inside wall 6 with a flow orifice 46 and facing a flow rate regulation member 45, and a bottom portion 1.3 including a bottom outlet orifice 9 forming a seat for a valve member 11. The three portions 1.1, 1.2, and 1.3 can be disassembled and they are connected together by quick couplings 10.

The valve member 11 is controlled by a magnetic control device of the invention. This device includes a drive member 13 of material having high magnetic permeability coupled to the valve member 11. This drive member includes a link member formed in this case by a plurality of bars 15 e.g. made of magnetic stainless steel, fixed via their bottom ends to the valve member 11 so that the axes of the bars 15 are regularly distributed around a cylinder that is coaxial with the tubular valve body 1. At their ends remote from the valve member, the link bars 15 are connected to rings 19 made of material having high magnetic permeability. There are four rings 19 in the embodiment shown which are mounted to slide on a sleeve 21 of non-magnetic material secured to the valve body 1 and extending coaxially with said body, and inside it. The sleeve 21 is closed at its bottom end by an end wall 24. At its top end, the sleeve 21 is fixed to the top end of the tubular body 1, e.g. by welding, and it is open to the outside of the tubular body 1.

The magnetic control device for controlling the valve member 11 also includes a magnetic field generator which is implemented in this case in the form of four permanent magnets 33 mounted in pairs inside the sleeve 21 to co-operate with the drive member 13. The axial ends of each pair of magnets 33 are of opposite polarity.

The magnets 33 are mounted on a control rod 35 on either side of a spacer 37 that separates the two pairs of magnets 33. The magnetic field generator constituted by the magnets 33 is coupled to the control rod 35 and can thus slide inside the sleeve under the effect of a force being exerted on the rod. Outside the tubular body 1, the control rod 35 is connected to an actuator device (not shown).

To optimize the magnetic link between the magnets 33 and the drive member 13, the rings 19 are four in number and they are disposed in pairs facing each of the axial ends of each pair of magnets. In this way, the magnets 33 generate a magnetic field in an axial direction that is channeled via the rings 19 into the inside of the link bars 15. Since the ends of each pair of magnets 33 are of opposite polarity, a magnetic field loop is thus established, as represented by bold lines M in FIG. 2. This provides optimum magnetic coupling enabling the magnetic field generator and the drive member to be miniaturized.

The flow rate regulation member 45 is controlled by a magnetic control device of the invention analogous to the device controlling the valve member 11 and comprising a drive member given overall reference 47. In the embodiment shown, the flow rate regulation member 45 is constituted by a ring of material having high magnetic permeability which acts as one of the rings 19 of the member 13 for driving the valve member 11. Like the drive member 13, the drive member 47 comprises a plurality of link bars 49, of which only one is shown in the figure, secured to the flow rate regulator member 45 and disposed around a cylinder that is coaxial with the sleeve 21. At their ends remote from the flow rate regulation member 45, the bars 49 are connected to a ring 51 of material having high magnetic permeability and mounted to slide on the sleeve 21. A magnetic field generator constituted by two magnets 53 is mounted to slide inside the sleeve 21 facing the drive member 47. The two magnets 53 are disposed so as to generate a magnetic field that extends in an axial direction. As above, a magnetic loop is thus obtained passing between the ends of the pair of magnets 53 via the ring 51, the link rods 49, and the flow rate regulator member 45.

The pair of magnets 53 is also coupled to a control tube 55 which is slidably mounted in the sleeve 21 and which extends beyond the top end of the sleeve. In this case, the pair of magnets 53 is engaged on a small diameter bottom portion of the control tube 55, being locked between a top shoulder and a spring clip fixed on the bottom end of the control tube 55.

The control rod 35 associated with the valve member 11 passes through the control tube 55.

In operation, the terminal flow orifice 9 is opened or closed by acting on the valve member 11 via the control rod 35: a traction force exerted on said rod causes the magnetic field generator constituted by the magnets 33 to slide upwards inside the sleeve 21 and, because of the magnetic coupling between its magnets and the drive member 13, it causes the valve member 11 that is coupled to said drive member, to be lifted. When the control rod 35 is moved downwards, the associated magnetic control device entrains the valve member 11 downwards and presses it against the seat 9.

In parallel, the flow rate can be adjusted by acting on the position of the flow rate regulation member 45 via the control tube 55 which operates in a manner analogous to that described above for the control rod 35.

This magnetic control makes it possible to implement a filler spout that does not include any sealing ring on a moving part and that does not include any member that extends across the flow.

The invention is not limited to the embodiment described, but on the contrary it extends to any variant that might use equivalent means to reproduce the essential characteristics as claimed. For example, although a magnetic field generator is described as being implemented in the form of one or more pairs of magnets, it is also possible to implement the generator in any other form. In particular, it would be possible to use an electrically actuatable electromagnetic generator, said generator being slidable inside the sleeve and connected to an actuator member opening to the outside of the tubular body as is the case for a permanent magnet generator as described above, or else it could be fixed inside the sleeve so as to cause the drive member of the valve to be lifted when excited by an electrical current. It is also possible to replace the rings of material having high magnetic permeability with magnets.

Although the link member is shown as being in the form of cylindrical bars, thereby simultaneously enabling the drive member to be lightened while ensuring that it is cleaned by a flow taking place between the bars, it is also possible to implement it in the form of a sleeve interconnecting the rings.

Although the invention is described above with reference to a filler spout including two shutter members, i.e. one member constituting a flow rate regulator and another member constituting a valve member proper, the invention is equally applicable to a filler spout including a single shutter member, in particular when the filler spout is connected to a low pressure feed.

I claim:

1. A magnetic control device for controlling a shutter member movably mounted in a tubular body facing a flow orifice of the body, the device including a drive member of magnetic material coupled to the shutter member and co-operating with a magnetic field generator connected to a control member, the magnetic field generator being mounted inside a sleeve of non-magnetic material secured to the tubular body, the sleeve extending substantially along an axis of the tubular body and having one end closed and an opposite end opening out to the outside of the tubular body, the drive member being slidably mounted outside the sleeve and facing the magnetic field generator.

2. A device according to claim 1, wherein the drive member includes at least two rings slidably mounted on the sleeve and connected together by a link member extending in an axial direction, the magnetic field generator being organized to generate a field in an axial direction and possessing two axial ends disposed facing the rings of the drive member.

3. A device according to claim 2, wherein one of the rings of the drive member forms the shutter member.

4. An adjustable flow rate filler spout comprising a tubular body having a terminal flow orifice associated with a first shutter member forming a valve member, the spout including an upstream flow orifice defined by an intermediate constriction in the tubular body and associated with a second shutter member forming a flow rate regulation member, the first and second shutter members being controlled by a magnetic control device including drive members of magnetic material co-operating with a magnetic field generator, the magnetic field generators being mounted inside a sleeve of non-magnetic material secured to the tubular body, the sleeve extending substantially along an axis of the tubular body, and having one end closed and an opposite end opening out to the outside of the tubular body, the drive member being slidably mounted outside the sleeve and facing the corresponding magnetic field generators.

5. A filler spout according to claim 4, wherein the control member of one of the two magnetic field generators is slidably mounted in the control member of the other magnetic field generator.

* * * * *